(12) United States Patent
Griffin et al.

(10) Patent No.: US 6,618,009 B2
(45) Date of Patent: Sep. 9, 2003

(54) METHOD AND APPARATUS FOR LOCATING THE SOURCE OF AN UNKNOWN SIGNAL

(75) Inventors: Christopher Griffin, Malvern (GB);
Paul R. Edmonds, Malvern (GB);
Simon R. Duck, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 09/955,224

(22) Filed: Sep. 19, 2001

(65) Prior Publication Data

US 2002/0070889 A1 Jun. 13, 2002

Related U.S. Application Data

(63) Continuation of application No. 09/613,746, filed on Jul. 11, 2000, now abandoned.

(30) Foreign Application Priority Data

Aug. 19, 1999 (GB) .............................................. 9919525

(51) Int. Cl.[7] .................................................. G01S 5/04
(52) U.S. Cl. ........................ 342/432; 342/444; 342/453
(58) Field of Search ................................. 342/174, 352, 342/358, 432, 444, 453

(56) References Cited

U.S. PATENT DOCUMENTS

| | | | | |
|---|---|---|---|---|
| 5,008,679 A | * | 4/1991 | Effland et al. ............... | 342/353 |
| 5,594,452 A | * | 1/1997 | Webber et al. ............... | 342/353 |
| 5,936,571 A | * | 8/1999 | Desjardins ................... | 342/357 |
| 6,018,312 A | * | 1/2000 | Haworth ...................... | 342/353 |

OTHER PUBLICATIONS

S. Stein, "Algorithms for Ambiguity Function Processing" IEEE Trans. on Acoustics Speech and Signal Processing, vol. ASSP–29, No. 3, Jun. 1981.

* cited by examiner

*Primary Examiner*—Dao Phan
(74) *Attorney, Agent, or Firm*—Nixon & Vanderhye P.C.

(57) ABSTRACT

A method of determining the location of an unknown source 10 transmitting a signal to satellite relays 14 and 16 comprises receiving replicas of the signal from the relays at receivers 18. The receivers 18 also transmit and receive reference signals via respective relays 14 and 16. All signals are downconverted, digitized and correlated with one another in pairs using a correlation function including a term which compensates for time varying differential frequency offset (DFO). Compensation for time varying differential time offset or time dilation is achieved by replicating or adding to signal samples and applying phase corrections. This procedure enables a correlation maximum and associated measurement results to be obtained despite the effects of relay satellite motion which mitigate against this. Results are used in a prior art geometrical technique to locate the unknown transmitter.

15 Claims, 13 Drawing Sheets

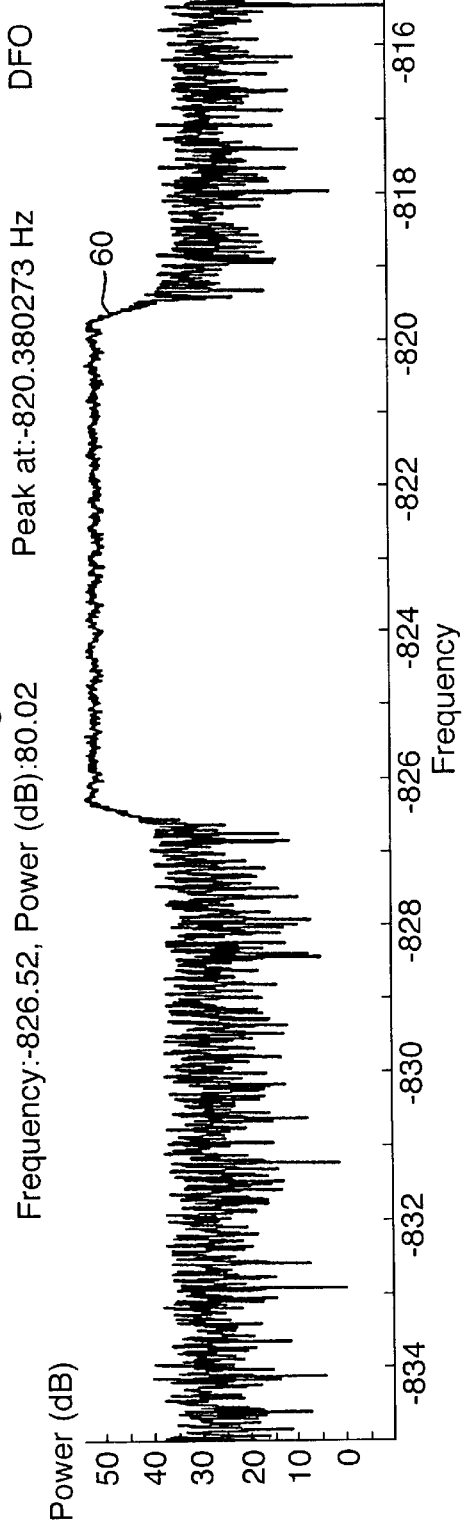
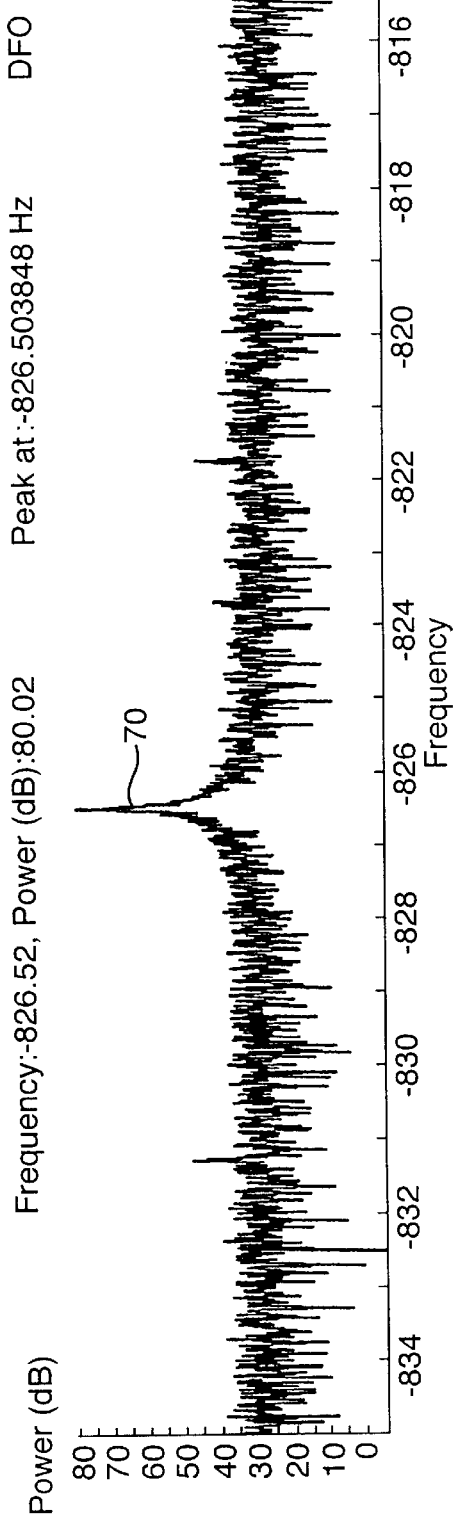

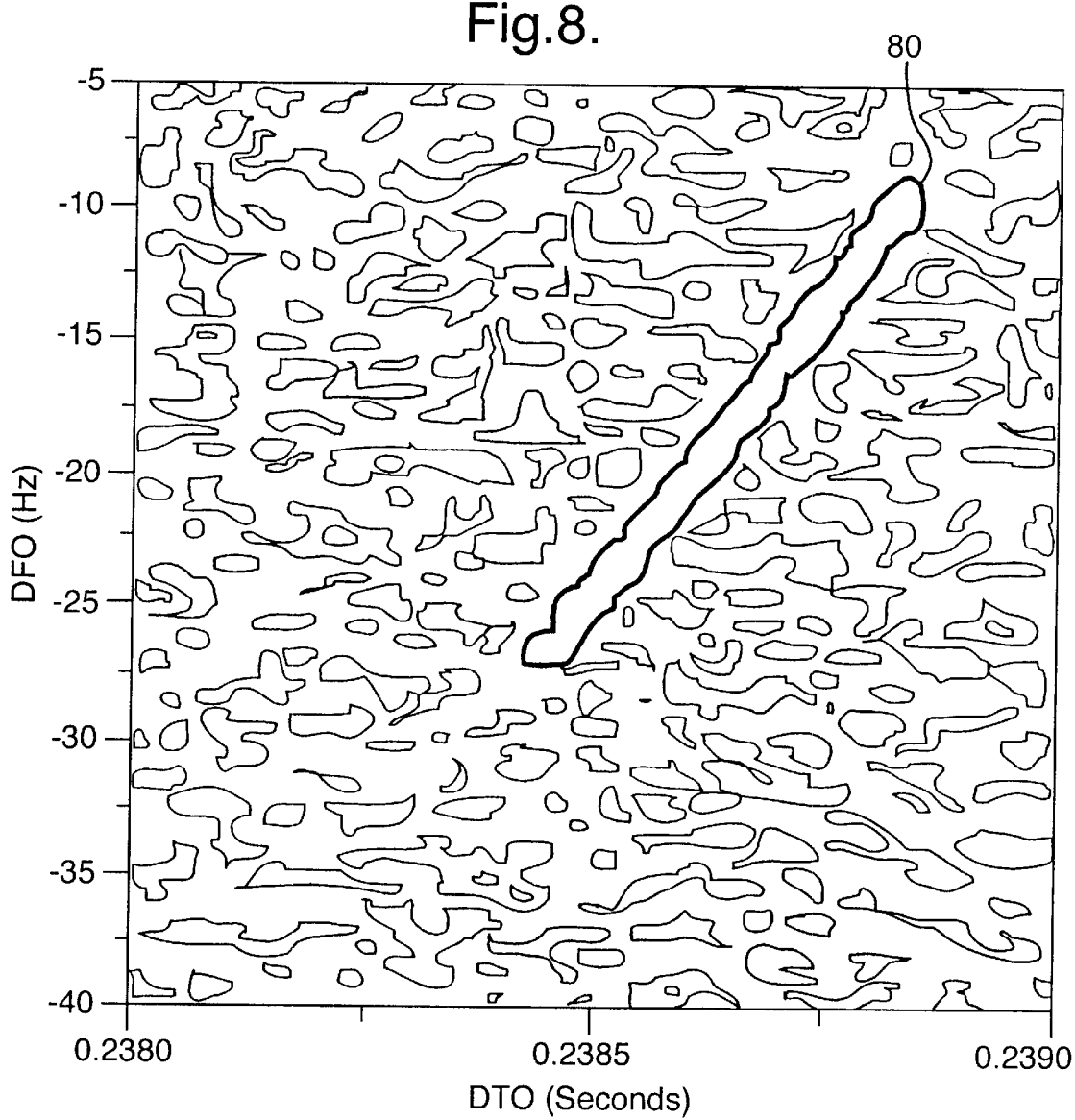

METHOD AND APPARATUS FOR LOCATING THE SOURCE OF AN UNKNOWN SIGNAL

This application is a continuation of application No. 09/613,746, filed Jul. 11, 2000, now abandoned, the entire content of which is hereby incorporated by reference in this application.

BACKGROUND OF THE INVENTION

1. Field of the Invention

This invention relates to a method and apparatus for locating the source of an unknown signal received by a plurality of signal relays.

2. Discussion of Prior Art

In IEEE Trans. on Aerospace and Electronic Systems, Vol. AES-18, No. 2, March 1982, P C Chestnut describes the basic technique of locating the source of an unknown signal such as a ground-based communications antenna; it involves determining the time difference of arrival (TDOA) and/or frequency difference of arrival (FDOA) of two signals from the source relayed to receivers by respective intercept platforms in the form of relay satellites in geostationary or geosynchronous orbits. The signals are relayed by the satellites along two independent signal paths to a receiving station, ie ground-satellite-ground paths. One satellite lies in the main beam or lobe of the source antenna radiation pattern and the other in a sidelobe. Each satellite accepts a signal (uplink) from the source, frequency shifts it using a turnaround oscillator and returns its frequency-shifted equivalent (downlink) to a ground receiver. The two signal path lengths are normally unequal, and this gives two signal arrival times at the receiver differing by the TDOA value. FDOA is due to relay satellite motion relative to the Earth and to one another, which Doppler shifts both downlink signal frequencies. The positions of the two satellites and the receiving station are known, and the locus of points of constant TDOA or FDOA is in each case a surface which intercepts the Earth's surface to define a curve referred to as a line of position (LOP). Two measurements of TDOA or FDOA at different times, or one of each at one or more times, provides two LOPs which intersect at the position of the source to be located.

TDOA is also referred to as differential time offset (DTO) and FDOA as differential frequency offset (DFO) or differential Doppler shift.

The technique of determining TDOA and FDOA from two received signals is described in IEEE Trans. on Acoustics Speech and Signal Processing, Vol. ASSP-29, No. 3, June 1981 by S Stein in a paper entitled "Algorithms for Correlation Function Processing". It is also described in U.S. Pat. No. 5,008,679 relating to a transmitter location system incorporating two relay satellites and using both TDOA and FDOA measurements. The technique involves deriving the degree of correlation between the signals by multiplying them together and integrating their product. Trial relative time shifts and frequency offsets are introduced in sequence between the signals and their correlation is determined for each. The time shift and frequency offset which maximise the correlation are taken to be the required TDOA and FDOA, subject to correction for signal propagation delays in satellite transponders and frequency shifts in satellites and in processing.

The degree of correlation is determined from what is referred to by Stein as the cross ambiguity function or CAF $A(\tau,\nu)$ defined by:

$$A(\tau, \nu) = \int_0^T z_1^*(t) z_2(t+\tau) e^{-2\pi i \nu t} dt \quad (1)$$

$A(\tau,\nu)$ is the integral of the product of two signals $z_1(t)$ and $z_2(t)$ [complex or analytic versions of real signals $s_1(t)$ and $s_2(t)$] after a trial time shift $\tau$ and a trial frequency shift $\nu$ have been introduced between them in processing after reception at the receiving station. The asterisk in $z_1^*(t)$ indicates a complex conjugate. When a maximum value of the modulus of $A(\tau,\nu)$, ie $|A(\tau,\nu)|$, is obtained, this being a correlation peak in the surface $|A(\tau,\nu)|$ as a function of the two variables $\tau$ and $\nu$, the values of $\tau$ and $\nu$ for the peak are the required TDOA and FDOA.

The system of U.S. Pat. No. 5,008,679 requires satellite positions and velocities to be known accurately, and needs highly stable phase in ground station and satellite oscillators. It has bandwidth limitations for satellite orbits inclined to the Earth's equatorial plane, and needs two receivers which are on the same site and have common time and frequency references.

U.S. Pat. No. 6,018,312 to Haworth relates to a transmitter location system employing a reference signal passing via the same satellite relays as the unknown signal and processed in phase coherence with it. The reference signal is used to remove a number of sources of error and limitations to which earlier techniques are subject, giving improved accuracy and capability for use under a wider range of conditions. Despite this improvement it has been found surprisingly that from time to time it can be impossible to discern a correlation peak in the CAF surface $|A(\tau,\nu)|$-all that can be seen is noise.

A related but different technique for counteracting sources of error using a broad band approach is disclosed in U.S. Pat. No. 5,594,452 to Webber et al.

SUMMARY OF THE INVENTION

It is an object of this invention to provide an alternative method and apparatus for transmitter location.

The present invention provides a method of locating the source of an unknown signal received by a plurality of signal relays, the method including the steps of:

(a) arranging for a plurality of receivers to receive replicas of the unknown signal via respective signal relays; and (b) subjecting the replicas to correlation processing;

characterised in that correlation processing in step (b) is performed with a complex correlation function (CCF) at least partly compensated for change in the replicas' Differential Frequency Offset (DFO) with time due to relay motion relative to the source and receivers.

In a preferred embodiment of the invention, correlation processing in step (b) is also performed with data sets adapted in phase and subject to data replication or removal to counteract time dilation arising from relay motion relative to the source and receivers.

As indicated above it has been found that the reason for failure to obtain a correlation peak using a prior art ambiguity function is due to relay motion relative to the source and receivers. This is very surprising for geostationary satellite relays in particular, because their motion has hitherto been treated as constant over a measurement interval, which in turn implies that it affects all measurements at a site equally. Satellite motion alone would not have been expected to make a correlation peak obtainable on some occasions but not others. Despite this, in accordance with the invention it has been discovered that signal correlation is affected by velocity and acceleration components of the relay satellite along the lines joining it to the source and receiver, which results in the replicas' DFO and Differential Time Offset (DTO) being time dependent. DFO variation can be compensated as indicated above by adapting the correlation function, and where necessary DTO variation can be compensated also by adapting data samples.

Correlation processing in step (b) may include introducing a trial time offset between the replicas and evaluating their correlation and iterating this to obtain a correlation maximum and derive at least one of the replicas' DTO and DFO; it may be carried out with a CCF containing an exponent of a function of time having a first term which is a constant DFO value and a second term which is a product of time and a constant value for rate of change of DFO with time, ie a constant differential frequency rate offset (DFRO) value, and wherein step (b) also includes introducing a trial value corresponding to DFRO prior to evaluating correlation and iterating one type of trial value for each of the other type, repeating for more values of the other type and determining a DFRO value appropriate to compensate at least partly for change in DFO with time.

The CCF may be expressed as $A(\tau_0, b_1, b_2)$ given by:

$$A(\tau_0, b_1, b_2) = \int_0^T z_1^*(t) z(t + \tau_0) e^{-2\pi i (b_1 + 2 b_2 t) t} dt \qquad (2)$$

where $z_1$ and $z_2$ are data sets representing two signals being correlated after traversing different paths, the asterisk denoting the complex conjugate of $z_1$, T is a time over which data sets are taken, $\tau_0$ is the signals' DTO, and $b_1$ and $b_2$ are constants in a linear approximation to the variation of their DFO with time t as follows:

$$DFO \equiv v = b_1 + 2 b_2 t \qquad (3)$$

where $b_1$ is an initial constant DFO value at initiation of data recordal and $2 b_2$ is DFRO as defined above.

The constant DFO value $b_1$ may be determined by Fourier transformation of the Equation (2) product of $z_1^*(t) z_2(t+\tau_0) \exp(-2\pi i b_2 t^2)$ to the frequency domain (ie ignoring the $b_1$ term) after each iteration of Step (b), $b_1$ being subsequently determined as the frequency at which the CCF maximum occurs. This reduces the computation required because it avoids stepping through trial values of $b_1$ and re-evaluating the CCF for each. For a data set of N samples it reduces the number of computations from of order $N^2$ to $N \log_e N$, a substantial reduction for large $N \sim 10^6$.

Correlation may be performed with a sample data set adapted in phase and number of samples, samples being replicated in or removed from the set according which data set is selected for adaptation ($z_1$ or $z_2$) and also to the sign of the rate of change with time of DTO associated with the data set. Data samples in one of two data sets to be correlated may adapted in phase by samples following a removed sample being multiplied by a phase factor or by samples including and following a replicated sample being multiplied by such a factor, the phase factor being either $e^{2\pi i f \Delta t}$ or $e^{-2\pi i f \Delta t}$ according to which of the two data sets is adapted and to the sign of DTO change with time, and wherein f is a signal band centre frequency of the samples after downconversion for sampling and $\Delta t$ is the interval between samples.

Samples may alternatively be selected for removal and replication on the basis of the following equation:

$$\tau_m = -\frac{\lambda}{c} b_1' t_m - \frac{\lambda}{c} b_2 t_m^2 = m \Delta t \qquad (4)$$

where $t_m$ is the time from initiation of sampling to the mth sample selected for alteration, m is the selection number, $\Delta t$ is the sampling interval, $\tau_m$ is the time dilation (expressed as a number of sampling intervals) and $\lambda$ is the wavelength at the centre frequency of the signal sampling band before any frequency downconversion at a receiving site. The parameter $b_1'$ is an estimate of DFO ($b_1$) with any systematic error (eg frequency shift at a satellite relay) counteracted by deriving an estimated correction using a reference signal. The parameter $b_1'$ may alternatively be derived by using trial values of it and calculating the modulus of the CCF until a CCF maximum is obtained. It also is possible to exploit $b_2$ in the above expression as an independent parameter, thereby dissociating time dilation and time variation of DFO. Equation (4) is solved for $t_m$ to determine times at which time dilation results in data sets $z_1$ and $z_2$ being out of step by successive increments of $\Delta t$. If the effects of time dilation are not too severe, a linear approximation may be employed by deleting the $t_m^2$ term in Equation (4).

In an alternative aspect, the present invention provides a location device for locating the source of an unknown signal received by a plurality of signal relays, and including:
(a) a plurality of receivers for receiving replicas of the unknown signal via respective signal relays;
(b) a correlation processor for correlating the replicas and obtaining a correlation maximum indicating at least one of their DTO and DFO;
characterised in that the correlation processor is arranged to perform correlation with a complex correlation function (CCF) at least partly compensated for change in DFO with time due to relay motion relative to the source and receivers.

In a preferred embodiment of the invention, the correlation processor is also arranged to perform correlation with data sets adapted in phase and subject to data replication or removal to counteract time dilation arising from relay motion relative to the source and receivers.

The correlation processor may be arranged to employ a CCF containing an exponent of a function of time having a first term which is a constant DFO value and a second term which is a product of time and a constant value for rate of change of DFO with time, ie a constant differential frequency rate offset (DFRO) value, and wherein the correlation processor is also arranged to introduce trial values of DFRO and to evaluate correlation for pairs of trial values of DTO and DFRO iteratively to obtain a correlation maximum.

The correlation processor may be arranged to introduce a trial time offset between the replicas, evaluate their correlation and iterate this procedure to obtain a correlation maximum. It may employ a sample data set adapted in phase and number of samples, samples being replicated in or removed from the set according which data set is selected for adaptation ($z_1$ or $z_2$) and also to the sign of the rate of change with time of DTO associated with the data set. It may be arranged to adapt samples in one of two data sets to be correlated in phase by multiplying samples following a removed sample by a phase factor or by multiplying samples including and following a replicated sample by such a factor, the phase factor being either $e^{2\pi i f \Delta t}$ or $e^{-2\pi i f \Delta t}$ according to which of the two data sets is adapted and to the sign of DTO change with time, and wherein f is a signal band centre frequency of the samples after downconversion for sampling and $\Delta t$ is the interval between samples.

The correlation processor may select samples for removal and replication on the basis of the correlation function's time dimension spread over an interval in which the samples were obtained. If a CCF peak is obtainable from data without time dilation compensation, the time over which correlation extends may be estimated. A selected data set may be contracted or expanded by the removal or insertion of samples according to whether data set $z_1$ or $z_2$ is adjusted and also according to whether time dilation is positive or negative. Alternatively, the correlation processor may select samples for removal and replication on the basis of Equation (4) above or a linear approximation thereto

BRIEF DESCRIPTION OF THE DRAWINGS

In order that the invention might be more fully understood, an embodiment thereof will now be described, by way of example only, with reference to the accompanying drawings, in which:

FIGS. 6 and 7 are graphs of complex correlation function signal power against frequency for equivalent situations except that in the former case there is no relay motion compensation whereas in the latter case there is.

FIGS. 8 to 11 are graphs of simulated noise-free results for DTO and DFO plotted against one another and showing time and frequency distortion, frequency compensation, time compensation and time and frequency compensation respectively.

DETAILED DISCUSSION OF PREFERRED EMBODIMENTS

Figure 1:
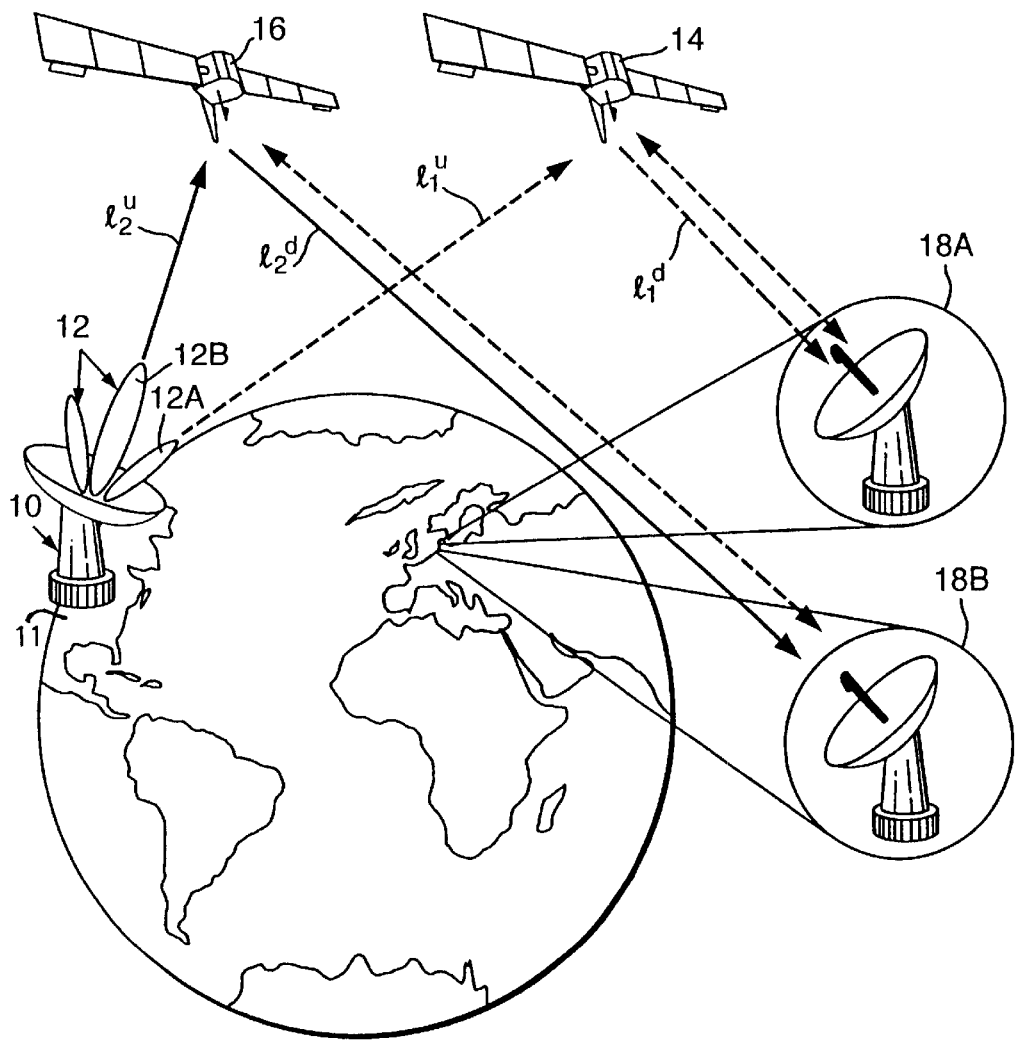
FIG. 1 illustrates signal propagation between an Earth-based transmitter, satellite relays and Earth-based receivers.

Referring to FIG. 1, an unknown transmitter 10 located in the United States of America 11 generates a signal which causes interference with satellite communications. The transmitter 10 has a radiation intensity pattern 12 with a sidelobe 12A directed to a first satellite 14 in a geostationary orbit, to which its signal propagates along a first uplink path $1_1{}^u$ (dotted line). It also has a radiation pattern main lobe 12B directed to a second satellite 16 in such an orbit; its signal propagates along a second uplink path $1_2{}^u$ to the satellite 16 and produces interference with communications signals using the latter. The unknown signal frequency is determined by spectrum analysis equipment which routinely monitors satellite channels. A typical communications satellite operating at Ku band (11–14 GHz) has 16 channels each 36 MHz wide and each capable of carrying 100 communications signals. The superscript "u" to path references $1_1{}^u$ and $1^{2u}$ denotes uplink from the unknown transmitter 10.

The satellites 14 and 16 are monitored by respective receivers in the form of ground station antennas 18A and 18B located in England and referred to collectively as receivers 18. They receive the signal from the unknown transmitter 10 and retransmit it along first and second downlink paths $1_1{}^d$ and $1_2{}^d$ to respective receivers 18. Here the superscript "d" denotes a downlink path to a monitoring receiver. The receivers 18 receive respective replicas of the unknown signal which include path delays and Doppler frequency shifts from satellite motion. The receivers 18 also transmit reference signals to the satellites 14 and 16 respectively, these signals being replicas of one another which are phase-locked together when transmitted initially. The satellites 14 and 16 return frequency shifted equivalents of the reference signals to respective receivers 18.

Figure 2:
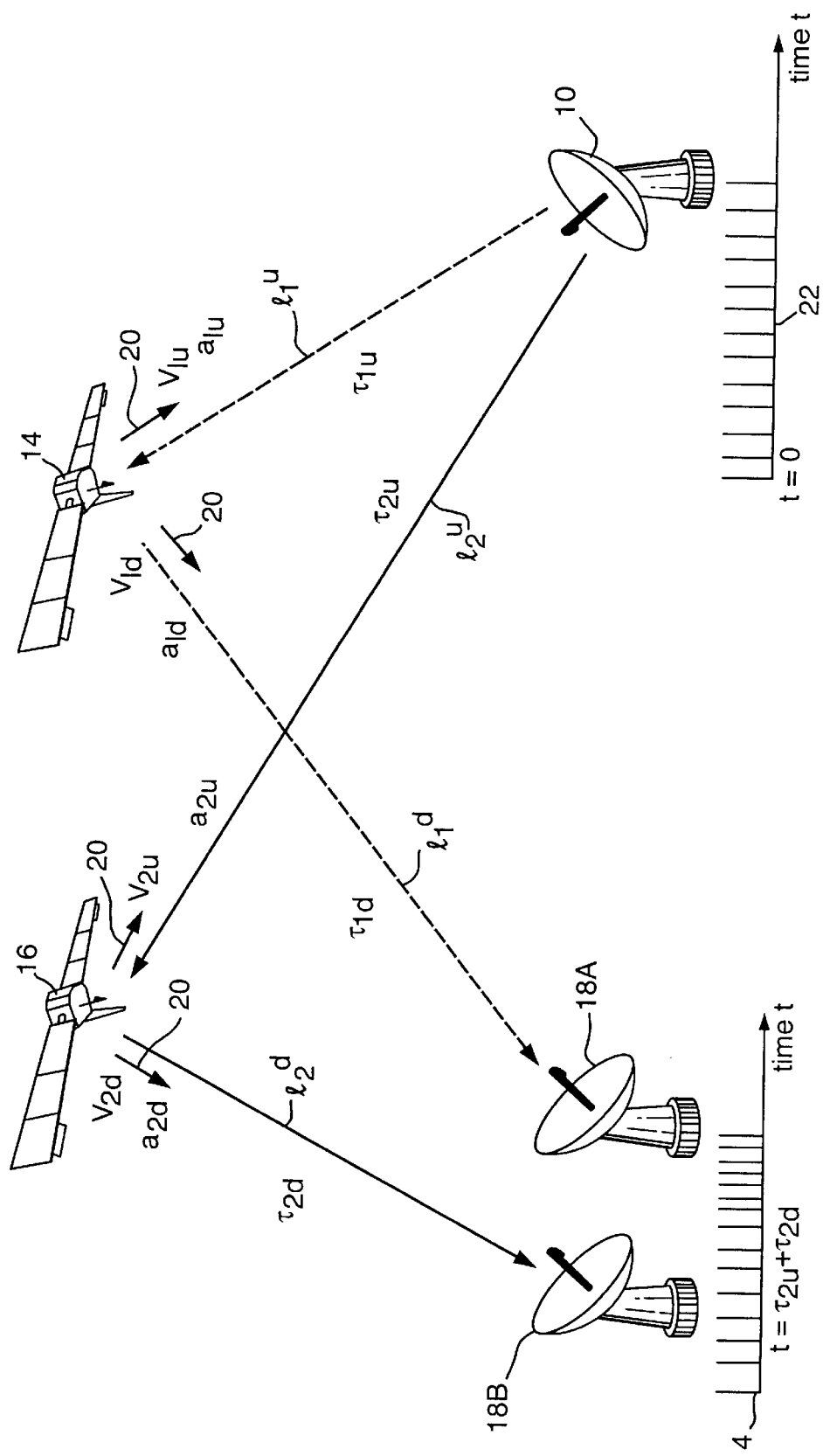
FIG. 2 indicates effects to be compensated by a location system of the invention.

Referring now also to FIG. 2, in which elements previously described are like-referenced, effects to be counteracted by the invention are indicated upon a schematic drawing of source/satellite/receiver geometry. These effects were discovered in experiments to investigate the feasibility of processing large sets of data obtained using satellites in geosynchronous orbits. It was found that failures to obtain correlation peaks with acceptable signal to noise ratio were due to specific aspects of satellite motion. This is very surprising, because geostationary or geosynchronous satellite motion relative to a source or receiver has hitherto been treated as being substantially constant over the relatively short sampling periods required for geolocation of a source, which implies that it would have an equal effect on all measurements in that interval at an individual site. One would not therefore expect satellite motion alone to be responsible for making a correlation peak obtainable on some occasions but not others. Despite this, in accordance with the invention it has been discovered that signal correlation is affected by satellite velocity and acceleration components along the lines joining the satellite to the source and receiver. As will be described later in more detail, it has been found that during a geolocation measurement these components can be sufficiently different at different times to make correlation obtainable on some occasions but not others.

FIG. 2 is marked with arrows 20 to indicate parameters comprising components of satellite velocity and acceleration (eg $v_{1u}$, $a_{1u}$) in the directions of the source 10 and receivers 18, together with signal time delay and associated signal paths as defined in the table below. The present invention involves processing which counteracts time varying DFO and preferably also time varying time dilation; the latter is depicted in FIG. 2 by a linear source time axis 22 and a non-linear receiver time axis 24. The axes 22 and 24 indicate that there is a time varying time separation or dilation between successive signals arriving at a receiver 18 because of satellite motion.

| Time Delay $\tau_{xy}$, Velocity Component $v_{xy}$ or Acceleration Component $a_{xy}$ | Path ($\tau_{xy}$) or Direction ($v_{xy}$ or $a_{xy}$) and Satellite or Receiver |
|---|---|
| $\tau_{1u}$ | Delay on Uplink path $1_1{}^u$ to Satellite 14 |
| $\tau_{1d}$ | Delay on Downlink path $1_1{}^d$ to Receiver 18A. |
| $\tau_{2u}$ | Delay on Uplink path $1_2{}^u$ to Satellite 16. |
| $\tau_{2d}$ | Delay on Downlink path $1_2{}^d$ to Receiver 18B. |
| $v_{1u}$ | Satellite 14 velocity component along uplink path $1_1{}^u$ to Source 10. |
| $v_{1d}$ | Satellite 14 velocity component along downlink path $1_1{}^d$ to Receiver 18A. |
| $v_{2u}$ | Satellite 16 velocity component along uplink path $1_2{}^u$ to Source 10. |

-continued

| Time Delay $\tau_{xy}$, Velocity Component $v_{xy}$ or Acceleration Component $a_{xy}$ | Path ($\tau_{xy}$) or Direction ($v_{xy}$, or $a_{xy}$,) and Satellite or Receiver |
|---|---|
| $v_{2d}$ | Satellite 16 velocity component along downlink path $1_2^d$ to Receiver 18B |
| $a_{1u}$ | Satellite 14 acceleration component along uplink path $1_1^u$ to Source 10. |
| $a_{1d}$ | Satellite 14 acceleration component along downlink path $1_1^d$ to Receiver 18A. |
| $a_{2u}$ | Satellite 16 acceleration component along uplink path $1_2^u$ to Source 10. |
| $a_{2d}$ | Satellite 16 acceleration component along downlink path $1_2^d$ to Receiver 18B. |

FIG. 2 shows what would happen to points originally regularly spaced on a waveform which passes over a path in space and is subjected to time varying Doppler effect. An analogue to digital converter (ADC) is used to sample a received signal and gives a regular set of samples to a signal which has undergone Doppler effect; these samples require timing adjustment, in one of the data sets $z_1$ or $z_2$ in Equation (2), in order to correspond to samples in the other data set which have undergone a different degree of Doppler effect. FIG. 2 does not portray this—but instead what is shown is the result of differential Doppler effect on an array of points on a waveform which were originally regularly spaced. The dilation differs across four receiver channels to be described later, and is shown schematically at 22 for a single channel.

Figure 3:
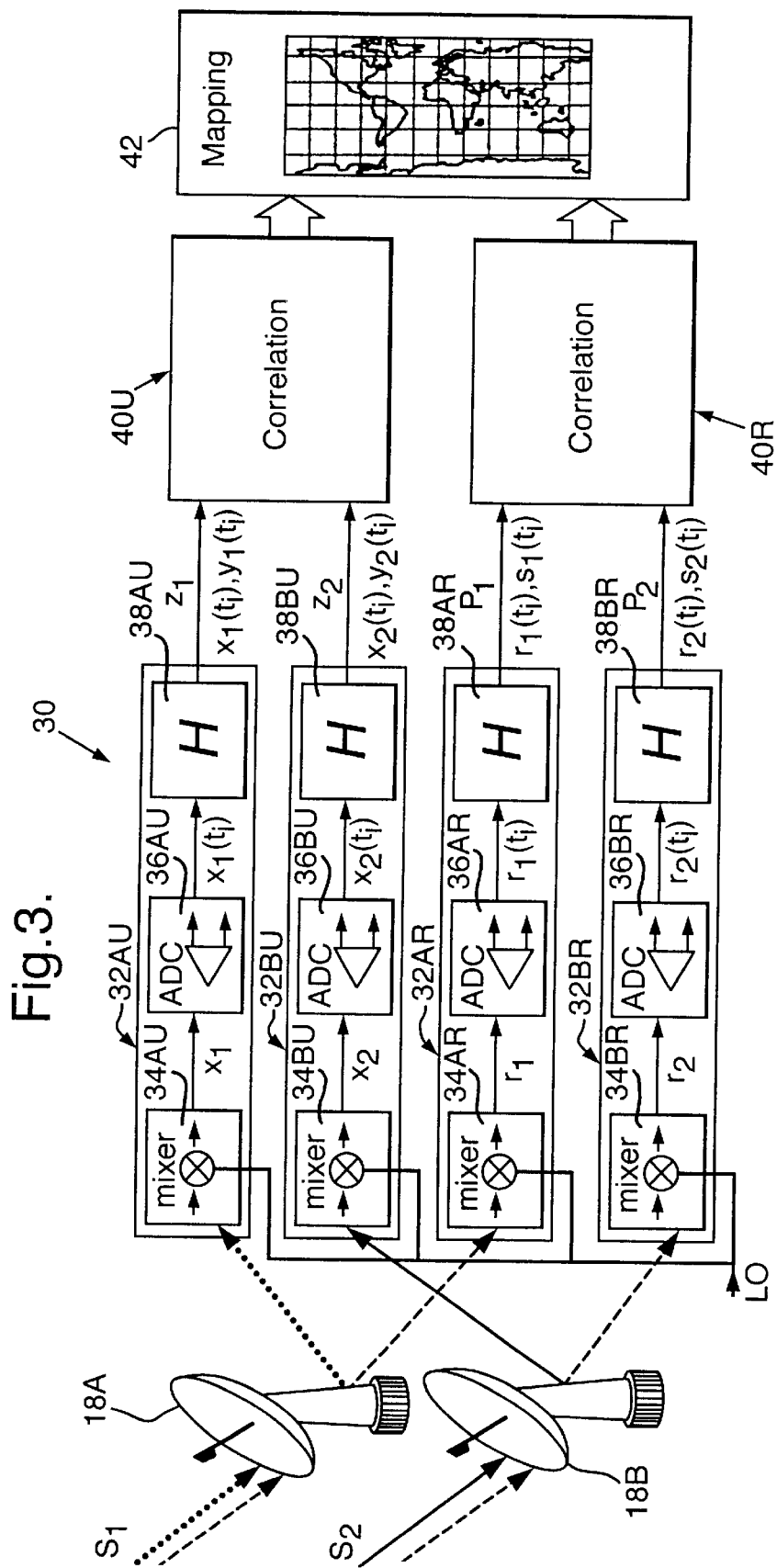
FIG. 3 shows schematically processing circuitry of a location system of the invention.

Referring now also to FIG. 3, a signal processing system for a transmitter location system (TLS) of the invention is shown schematically and indicated generally by 30. It is emphasised that this drawing is schematic and does not show all system features in detail. It will be described in outline only, because transmitter location is described in great detail in the prior art of U.S. Pat. No. 5,008,679 and published PCT application No. WO 97/11383. Readers of this specification are referred to PCT application No. WO 97/11383 for a detailed description of how transmitter location may be put into practice, except as regards measurement of additional parameters and complex correlation function processing to achieve satellite motion compensation in accordance with this invention.

To simplify description, the processing system 30 is illustrated functionally rather than in terms of actual items of apparatus; some items subsume multiple functions and others shown separately may be implemented together as a single device. The processing system 30 has four channels 32AR, 32AU, 32BR and 32BU; suffixes A and B indicate association with receivers 18A and 18B respectively and suffixes R and U indicate association with reference and unknown signals respectively. Components have like numerical references with differing suffixes distinguishing channels. The channels and their components will be referred to without suffixes to indicate any or all without differentiation, and with suffixes if necessary to be specific. Receiver 18A is connected to channels 32AU and 32AR, and receiver 18B is connected to channels 32BU and 32BR.

Each channel 32 contains a series-connected arrangement of a mixer stage 34 for frequency down conversion and analogue filtering, an analogue to digital converter (ADC) 36 and an exponentiation stage 38 (H) for conversion of real signals to complex equivalents with in-phase and quadrature components. The mixers 34 are connected to a common local oscillator signal feed LO. Outputs from exponentiation stages 38AU and 38BU pass to a first correlation processing stage 40U, and that from the exponentiation stages 38AR and 38BR to a second correlation processing stage 40R. The processing stages 40U and 40R carry out parameter determination and correlation function processing as will be described later in more detail. Geometrical calculation and mapping to locate the unknown transmitter 10 is done in a mapping stage 42. The exponentiation, correlation processing and mapping stages 38, 40 and 42 may be implemented in a single computer.

The processing system 30 operates as follows. Signals from the receivers 18 are amplified and fed to the mixer stages 34 where they are filtered and downconverted to a centre frequency suitable for analogue to digital (A/D) conversion. Downconversion takes place in several stages, with filtering to define the relevant signal frequency band in each case and to prevent aliasing at the A/D stage. Mixer stages 34AU and 34BU are tuned to extract the unknown signal, and mixer stages 34AR and 34BR are tuned to extract the reference signal.

The ADCs 36 sample signals from the respective mixer stages 34 using automatic level control (ALC) to minimise the effect of quantisation noise. The signal samples so formed are real, and the exponentiation stages 38 convert them to analytic or complex form using the Hilbert Transform. In particular, a set $s_1(t)$ of signal samples from channel 32AU is converted to an analytic sample set $z_1(t)$ which is then conjugated to form a set $z_1^*(t)$. A similar procedure but without conjugation is followed for channel 32BU to produce a sample set $z_2(t)$. These two analytic sample sets for the unknown signal are then correlated together at 40U as will be described later to determine their DFO and DTO. Like sample sets are produced at 38AR and 38BR for the reference signal and are correlated at 40R.

The real and imaginary parts of the complex sample are denoted as follows: channel 32AU: ($x_1(t_i)$, $y_1(t_i)$) or $z_1$; channel 32BU ($x_2(t_i)$, $y_2(t_i)$) or $z_2$; channel 32AR ($r_1(t_i)$, $s_1(t_i)$) or $p_1$; channel 32BR ($r_2(t_i)$, $s_2(t_i)$) or $p_2$.

Each correlation processing stage 40 correlates two sets of signal samples obtained respectively from distorted versions of the same original signal, the distortion arising from propagation via satellite relays; ie the two versions of the unknown signal in channels 32AU and 32BU are correlated with one another, as are the two versions of the reference signal in channels 32AR and 32BR. Each of the sample sets also has a noise component which is statistically independent of the noise component of sample sets from other channels.

As in the prior art, the procedure is to equalise the sample sets used in correlation, by introducing adjustable parameters into a correlation operation until the correlation function is a maximum; the parameters are related to the source/satellite/receiver geometry. The reference signal is used as in the prior art to remove noise which is correlated with that in the unknown signal, and the reference signal source provides a reference point with respect to which the unknown source location is determined. However, in the prior art each correlation operation involved only fixed values of differential frequency offset (DFO or ν) and differential time offset (DTO or τ). In the present invention, an expression for time varying DFO is used to compensate for satellite motion and if necessary time varying DTO is counteracted. If satellite motion is not too severe it is possible to obtain adequate results by compensating for time varying DFO only. The correlation operation is changed to implement this using a new correlation function different to that of Equation (1). The new function is referred to as the complex correlation function or CCF to distinguish it from the earlier expression; it is suitable for counteracting time varying DFO using geosynchronous satellites in orbits inclined to the ecliptic. It does not counteract time varying DTO, which is a different procedure to be described later. The CCF is expressed as $A(\tau_0, b_1, b_2)$ given by Equation (2) above and repeated below for convenience:

$$A(\tau_0, b_1, b_2) = \int_0^T z_1^*(t)z(t+\tau_0)e^{-2\pi i(b_1+2b_2t)t}dt \quad (2)$$

where $z_1$ and $z_2$ are sets of data samples representing two signals being correlated, the asterisk denotes the complex conjugate of $z_1$, T is the time over which samples are taken, $\tau_0$ is a time invariant component of the differential time offset (DTO) between the signals because of their different paths, and $b_1$ and $b_2$ are constants in the Equation (3) expression for DFO:

$$DFO \equiv v = b_1 + 2b_2 t \quad (3)$$

The constant $b_1$ is an initial value of DFO at the beginning of data recordal in a measurement; $2b_2$ is the rate of change of DFO with time, referred to as the differential frequency rate offset or DFRO.

Equation (3) expresses the discovery in accordance with the invention that in the case of geosynchronous satellites the variation of DFO over a measurement can often be assumed to be linear with time to a good approximation. If the variation of DFO with time is sufficiently non-linear, higher powers of time t—ie $b_3t^2$, $b_4t^3$ etc—may be included in the expression for DFO in Equation (3), but these can be omitted under most circumstances. They would be included if the motion of the satellite intercept platform were to require it, but at the expense of additional processing. The parameters $\tau_0$ and $b_2$ are determined by inserting trial values of each into Equation (2), evaluating the CCF and iterating this procedure to find the maximum value of the correlation surface $|A(\tau_0,b_1,b_2)|$, ie the modulus of the CCF as a function of $\tau_0$, $b_1$, $b_2$. It is not necessary to iterate $b_1$, because this is determined by inspection from the position of the CCF peak in the frequency domain as will be described later in more detail.

The correlation function $A(\tau_0,b_1,b_2)$ is applicable to situations where the satellite relays or intercept platforms are geostationary (GEO) and large data sets are required, leading to long data collection times and changing DFO. It is also applicable in situations where other types of intercept platforms are used, eg aircraft, GEO-LEO (low Earth orbit) MEO-MEO (medium Earth orbit) and LEO-LEO satellite combinations, but the additional technique of time dilation compensation is then relevant as will be described later.

In more detail, the correlation procedure using Equation (2) is as follows. Values for the delay and DFRO parameters $\tau_0$ and $b_2$ are chosen. Initially, these parameters are set to zero, and each is subsequently incremented through a predetermined range in discrete steps: each step is a multiple of a basic increment determined by the time $\Delta t$ between successive signal samples (that is, a multiple of the inverse of the sampling rate). The sampling rate is numerically equal to twice the sampling bandwidth set by low pass filters incorporated in the mixers 34.

The basic increments in $\tau_0$ and $b_2$ are denoted $\Delta t$ and $\Delta b_2$ respectively; $\Delta t=1/2B_s$ and $\Delta b_2=1/2T^2$, where $B_s$ and T are respectively the sampling bandwidth and sampling period of the ADCs 36.

For each selected value of DTO $\tau_0$, and DFRO $b_2$, a fast Fourier transform (FFT) of the inner product of $z_1^*(t)$ $z_2(t+\tau_0)$ multiplied by $\exp(-2\pi i b_2 t^2)$ is taken in order to convert it to the frequency domain. This enables the DFO $b_1$ to be determined automatically as that frequency offset at which the CCF function maximum occurs. All values of DFO are accounted for in a single FFT operation, so it is unnecessary to increment in steps $\Delta b_1$ and evaluate the CCF after each step. The FFT is repeated for each set of values of $(\tau_0, b_2)$; ie first values of $\tau_0$ and $b_2$ are selected and an FFT of $z_1^*(t)z_2(t+\tau)\exp(-2\pi i b_2 t^2)$ is evaluated. This is repeated for a range of values of $\tau_0$ in incremental steps of $\Delta t=1/2B_s$; $b_2$ is then incremented by one 0.001 Hz/second increment (this is a nominally convenient value) and the range of values of $\tau_0$ and associated FFT evaluations is repeated. The procedure is repeated until all values of $\tau$ and $b_2$ in their respective ranges have been used. For operation in the SHF frequency band, from 7.9 GHz to 8.4 GHz, with GEOsat intercept platforms, a typical value of $b_2$ was found to be 0.05 Hz/second. The modulus of the complex correlation function (CCF) has a maximum in the frequency domain, and the values of $\tau_0$ and $b_1$ at this maximum provide the required DTO and DFO. This provides a computationally efficient method of evaluating the CCF for a range of values of $(\tau_0, b_1, b_2)$.

The foregoing procedure locates the CCF maximum approximately. The location accuracy can be improved by interpolation as described in detail in International Patent Application No WO 97/11383 referred to above in relation to the complex ambiguity function (CAF). A range of values of the modulus (or modulus squared) of the CCF about its maximum value is taken, and interpolation is used to obtain a better estimate of the DTO, DFO and DFRO values.

This procedure results in values for $\tau_0$, $b_1$ and $b_2$ for the signal from the source to be located. It is repeated for the reference signal to obtain corresponding values $\tau_{0,ref}$, $b_{1,ref}$, and $b_{2,ref}$. The procedure gives DFO corrected to the instantaneous value it had at the beginning of data gathering when t=0; Equation (3) refers.

The values of $\tau_0$ and $\tau_{0,ref}$ are used to determine the uplink time difference of arrival $TDOA_u$, ie the difference between the times of arrival of the two signals or signal replicas from the unknown source 10 at respective satellites 14 and 16. The values of $b_1$, $b_{1,ref}$, $b_2$ and $b_{2,ref}$ are used to determine the DFO values for the unknown signals and the reference signals. A theoretical treatment of this will now be given.

Referring firstly to use of $\tau_0$ and $\tau_{0,ref}$, DTO is the difference in the time for two distorted versions of an original unknown or reference signal to traverse a two different paths to a receiver, ie either from the source 10 to a receiver 18 or from and to a receiver 18 via satellite 14 or 16. It can be represented as a function of time t over the duration of the sample, in terms of independent, time-constant parameters ($\tau_0$, $b_1$, $b_2$, . . . etc) related to the kinematics of the source/satellite/receiver system:

$$DTO \equiv \tau = \tau_0 + a_1 t + a_2 t^2 + a_3 t^3 + \quad (4)$$

The DTO $\tau$ is formed from the difference of two terms, $\tau_1$ and $\tau_2$, which represent signal propagation delays arising from traversal of different paths by replicas of an single original signal. It may be expressed as the sum of uplink and downlink delays plus any additional delay experienced in traversing electronic signal channels (e.g. a satellite transponder system) as follows:

$$\tau = \tau_1 - \tau_2 = (\tau_{1u} + \tau_{1d}) - (\tau_{2u} - \tau_{2d}) = (\tau_{1u} - \tau_{2u}) + (\tau_{1d} - \tau_{2d}) \quad (5)$$

where terms are defined in Table 1. Equation (5) represents the DTO in terms of the sum of the difference of uplink delays and difference of downlink delays, and subsumes within these any difference between electronic delays.

Sampling periods required for geolocation are usually relatively short (milliseconds to tens of seconds), and despite satellite motion it has been found that uplink and downlink delays can be represented as truncated power series in time t as follows:

$$\tau_{1u} = \tau_{0,1u} + a_{1,1u}t + a_{2,1u}t^2 + \ldots \quad (6)$$

with similar expressions for other delays given in the table earlier, ie $\tau_{1d}$, $\tau_{u2}$ and $\tau_{d2}$, with appropriate changes in coefficient indices to $a_{1,1d}$ etc. The coefficients $a_{1,1u}$ etc are not the same as the accelerations defined in the earlier table, but can be related to satellite velocities and accelerations. The full expression for the DTO becomes:

$$\tau = ((\tau_{0,1u} - \tau_{0,2u}) + (\tau_{0,1d} - \tau_{0,2d})) + ((a_{1,1u} - a_{1,2u}) + \quad (7)$$
$$(a_{1,1d} - a_{1,2d}))t + ((a_{2,1u} - a_{2,2u}) + (a_{2,1d} - a_{2,2d}))t^2 + \ldots$$

The parameters $\tau_0$, $a_1$, and $a_2$ etc can be found by inspection, ie ny equating coefficients of powers of time t in Equations (4) and (7).

Equation (7) for the DTO $\tau$ contains an uplink contribution which relates directly to the unknown source position to be determined, and a downlink contribution which is known from the satellite/receiver system geometry. The uplink contribution is referred to as the TDOA$_u$. In order to remove biases from the estimate of TDOA$_u$, an equivalent expression for the DTO of the reference signal is subtracted from the DTO of the unknown source signal. The known geometry of the source/satellite/receiver system allows the DTO of the reference signal to be calculated, apart from biases (e.g. satellite processing delays) affecting it in the same way as they affect the source signal DTO. This is why the reference signal DTO is also measured. The TDOA$_u$ is related to the measured DTO values through the relation:

$$TDOA_u = \tau - \tau_{ref} + \frac{(l_1^u - l_2^u)_{ref}}{c} = \tau - \tau_{ref} + \frac{(l_1^d - l_2^d)_{ref}}{c} \quad (8)$$

where c is the velocity of light and the subscript 'ref' in (8) indicates the paths are between the satellites and the receiving ground terminals over which the reference signal passes. DFO v is the difference in frequency between two received signals. It can be expressed in terms of the kinematics of the source/satellite/receiver system using the general relationship between Doppler, velocity and rate of change of time delay with time, exemplified for the satellite uplink, as follows:

$$\Delta v_{1u} = \frac{d}{dt}\phi_{1u} = -\frac{d}{dt}\left(\frac{l_1^u}{\lambda_u}\right) = \frac{v_{1u}}{\lambda_u} = -\frac{c}{\lambda_u}\frac{d}{dt}\tau_{1u} \quad (9)$$

where $\Delta v_{1u}$ is the Doppler shift in frequency occurring on the uplink path $l_1^u$ to satellite 14, $\tau_{1u}$ is the phase and $\lambda_u$ the wavelength of a signal (at its centre frequency) as received at the satellite 14 or 16 on uplink. Similar expressions for other system uplinks and downlinks are obtainable by change of indices.

The unknown signal DFO is given by:

$$DFO \equiv v = -\frac{c}{\lambda_u}\left[\frac{d}{dt}\tau_{1u} - \frac{d}{dt}\tau_{2u}\right] - \frac{c}{\lambda_d}\left[\frac{d}{dt}\tau_{1d} - \frac{d}{dt}\tau_{2d}\right] + \text{bias} \quad (10)$$

where $\lambda_u$ and $\lambda_d$ are the free space wavelengths of the uplink and dowlink signals respectively at their centre frequencies, and bias arises from satellite turnaround frequency shift and from satellite positional error.

The reference signal DFO is similarly given by:

$$DFO_{ref} \equiv v_{ref} = \quad (11)$$
$$-\frac{c}{\lambda_{u,ref}}\left[\frac{d}{dt}\tau_{1u} - \frac{d}{dt}\tau_{2u}\right]_{ref} - \frac{c}{\lambda_{d,ref}}\left[\frac{d}{dt}\tau_{1d} - \frac{d}{dt}\tau_{2d-}\right]_{ref} + \text{bias}$$

Subtracting (11) from (10) cancels out bias which is the same in both equations and gives an expression for the uplink frequency difference of arrival FDOA$_u$:

$$FDOA_u = v - v_{ref} + \frac{c}{\lambda_d}\left[\frac{d}{dt}\tau_{1d} - \frac{d}{dt}\tau_{2d}\right] - \quad (12)$$
$$\frac{c}{\lambda_{u,ref}}\left[\frac{d}{dt}\tau_{1u} - \frac{d}{dt}\tau_{2u}\right]_{ref} - \frac{c}{\lambda_{d,ref}}\left[\frac{d}{dt}\tau_{1d} - \frac{d}{dt}\tau_{2d}\right]_{ref}$$

where the last three terms are known from the system geometry, and the first two terms are the unknown and reference DFOs measured by determining the CCF maximum as described earlier. A further measurable is also determined, the differential frequency rate offset (DFRO= $2b_2$), this being the difference between Doppler rates (DFO rates of change) of signals measured along respective paths from the source 10, through the satellite intercept platforms 14 and 16, to the terrestrial intercept stations 18 as shown in FIG. 2. It may be used to form a parameter known as the uplink differential Doppler rate of arrival (DDROA$_u$) which exploits the acceleration effects of the source/satellite/receiver system. The DDROA$_u$ is the difference in Doppler-rates measured along the paths from the unknown source 10 to the satellite intercept platform 14 and 16. It is useful for the location of moving sources. The DDROA can be expressed in terms of the DFRO by direct differentiation of (12) as follows:

$$DDROA_u = DFRO - DFRO_{ref} + \frac{c}{\lambda_d}\left[\frac{d^2}{dt^2}\tau_{1d} - \frac{d^2}{dt^2}\tau_{2d}\right] - \quad (13)$$
$$\frac{c}{\lambda_{u,ref}}\left[\frac{d^2}{dt^2}\tau_{1u} - \frac{d^2}{dt^2}\tau_{2u}\right]_{ref} - \frac{c}{\lambda_{d,ref}}\left[\frac{d^2}{dt^2}\tau_{1d} - \frac{d^2}{dt^2}\tau_{2d}\right]_{ref}$$

The uplink TDOA (TDOA$_u$ as in (8)) and the uplink FDOA (FDOA$_u$ as in (12)) are used in the process of emitter position location of stationary RF sources (on the Earth's surface), as in the prior art of published International Application No WO 97/11383. In this particular case the DDROA$_u$ is not used explicitly. However, even when this is the case, the effect of satellite acceleration, which gives rise to the DDROA$_u$, is counteracted in the CCF as previously described using trial values of the parameter $b_2$ as described earlier. This parameter must be utilised in evaluating the CCF even when it is not needed further in locating the source 10. This is because the RF emitter location problem has two parts. The first is detection of the peak of the CCF and the second is relating the peak of the CCF to a position on the Earth's surface. The first phase is sensitive to the effects of satellite motion; requiring $b_2$ as a compensation parameter in addition to those used in prior art ($\tau_0$ and $b_1$).

The source 10 is located by using the determined $TDOA_u$ and $FDOA_u$ values to the Earth's surface by prior art geometrical methods. Firstly, the parameters $\tau_0$, $b_1$ and $b_2$ are obtained for the unknown and reference signals by maximising the CCF in Equation (2) as described earlier. The values of $b_1$, $b_{1,ref}$, $b_2$ and $b_{2,ref}$ are used to determine the signal and reference DFO values by insertion in Equation (3) with time t set to zero. This sets DFO as its instantaneous value at the beginning of data gathering—it is convenient to correct DFO to the value at this time but not essential.

The values of $v$ and $v_{ref}$ are substituted into Equation (12) to determine $FDOA_u$. Here again time t is set to zero; a consequence of this is that the location of the source 10 is determined using satellite ephemeris data (instantaneous positions in space) associated with the time at the start of sampling.

$TDOA_u$ is multiplied by c the velocity of light to give differential slant range (DSR), this being the difference between the two signal path lengths to the signal relay satellites 14 and 16 from a transmitting station, ie either the reference transmitter location 18A/18B or the unknown source 10. $FDOA_u$ is multiplied by $\lambda_u$ the signal wavelength in the uplink path to give the differential slant range rate (DSRR) or time rate of change of DSR. International Patent Application No PCT/GB95/02211 under the Patent Co-operation Treaty, published as WO 97/11383, describes in detail how to locate the source 10 on the Earth's surface from DSR and DSRR values using a Taylor expansion approach, and will not be described here.

Figure 4:
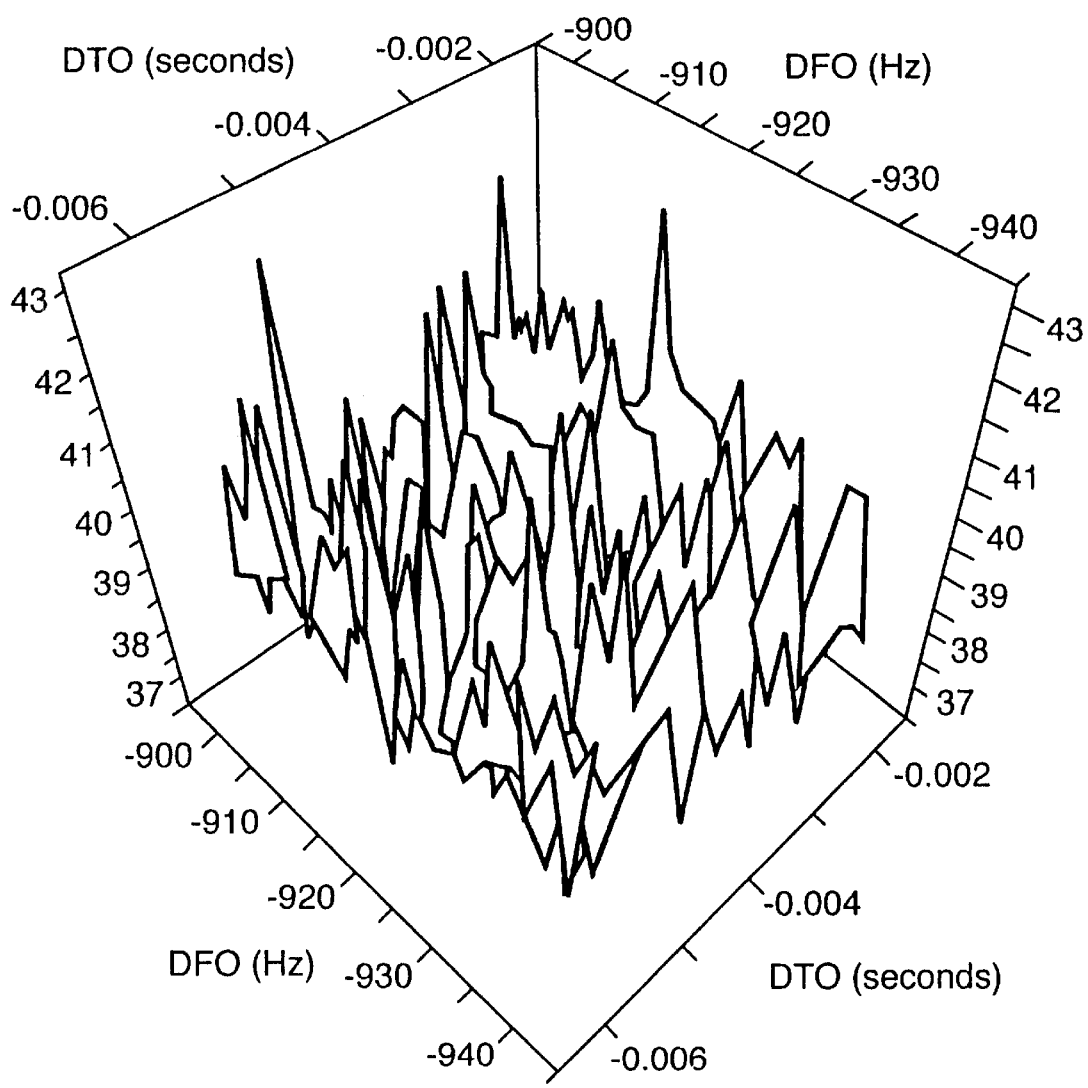
FIG. 4 is a two dimensional plot of the modulus of the prior art cross ambiguity function $|A(\tau,v)|$ as a function of the two variables $\tau$ and $v$ obtained using data affected by satellite motion relative to source and receivers.
Figure 5:
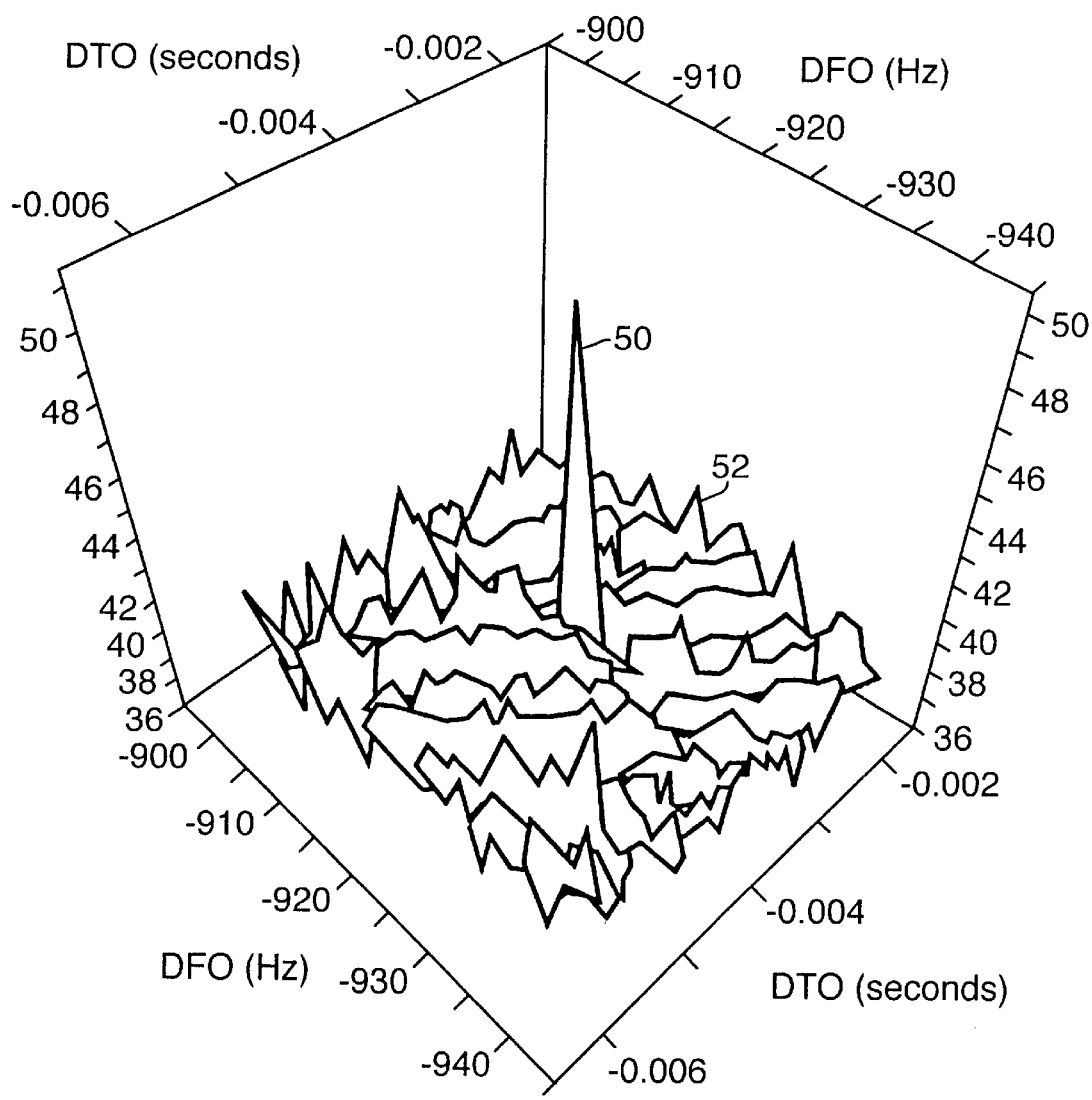
FIG. 5 is equivalent to FIG. 4 in all respects except that in accordance with the invention the complex correlation function $|A(\tau, b_1, b_2)|$ is plotted.

Counteracting only time varying DFO is sufficient for use with two geostationary satellite (GEOsat) relays when large sample sets are required. It focuses the CCF in the frequency dimension. Its effects can be seen from FIGS. 4 and 5; FIG. 4 shows results obtained using the prior art ambiguity function of Equation (1) and FIG. 5 shows results obtained using the complex correlation function or CCF of Equation (2) in accordance with the invention. The same data sets were used in both cases, obtained using two geostationary satellites. To meet patent requirements, these drawings were produced by tracing from colour prints in which colour indicated magnitude, and because of this they are not highly accurate. They do however provide a reliable indication of the benefits to be obtained by use of the invention.

FIG. 4 is a pseudo-three-dimensional view of the prior art complex ambiguity function of Equation (1) plotted against DTO and DFO. All that can be seen is noise. FIG. 5 is a similar plot of the complex correlation function of Equation (2) in accordance with the invention. In FIG. 5 a sharp correlation maximum 50 is fully resolved and stands well above the noise at 52.

Referring now to FIG. 6, the effect of satellite motion is shown once more in a plot of CCF modulus squared or power against frequency. There should be a single CCF peak at the DFO of −820.38, but instead there is a plateau 60 spread out over more than 16 Hz. This is contrasted with FIG. 7, in which DFO variation has been compensated giving a well resolved peak 70.

It may be necessary to use fast moving relay platforms for geolocation, eg aircraft, medium Earth orbit satellites (MEOsat), low Earth orbit satellites (LEOsat), or combinations of these with geostationary satellites (GEOsat). If so the CCF must also be focused in the time dimension to compensate for time dilation. This is necessary to compensate for a time delay $\tau_0$ that varies appreciably in the course of data collection for a measurement.

The CCF of Equation (2) only compensates for DFO variation in the sampling interval T. It does not compensate for time dilation, ie DTO variation in this interval. DTO variation is counteracted by periodic replication or excision of samples to compensate for samples in one data set ($z_1$ or $p_1$) being out of step with those in the associated data set ($z_2$ or $p_2$). For a measurement using two satellites, one geostationary and the other low earth orbit, it might involve inserting or removing one sample in every few hundred in a data set having in the order of a million samples. A phase correction is also required, and is applied to all samples in a data set following an insertion or excision, together with the inserted sample if this occurs. Successive phase corrections accumulate, each one being applied from the point of insertion or excision through the subsequent samples in the data set.

The timing of the sample adjustments, insertions/excisions is determined from the time taken for a sample slip to occur. A slip occurs when the value of time dilation changes by an amount equal to the sampling interval at the ADC. The time to the mth slip (total time dilation of m sampling intervals) is estimated by one of two approaches: either (a) from the spread of the ambiguity surface, in the time direction, across the sampling interval, or (b) from use of the $\tau_0$, $b_1$, $b_2$ parameters obtained from maximising the CCF as described earlier.

In approach (a), the correlation processor selects samples for removal from or replication in a set of data samples on the basis of the complex correlation function's time dimension spread over an interval in which the data set was obtained. If a CCF peak can be obtained from data without time dilation compensation, the number of time intervals $\Delta t$ over which the correlation is spread is estimated. For a spread of K time intervals, the number of samples between positions of adjustment (successive sample slips) of the data set is N/K where N is the number of samples in the data set. The data set $z_1$ or $z_2$ (see Equation (2)) selected for adjustment is a matter of implementation convenience and therefore arbitrary in principle; eg if $z_1$ corresponds to a signal expanded by time dilation, it can be contracted by sample removal to correct it, or alternatively $z_2$ may be expanded to match it. The selected data set is contracted or expanded by the removal or insertion of samples according to which of the two data sets is selected for adjustment and also according to whether the time dilation determined is positive or negative; if $z_1$ is selected, it is expanded if the time dilation is negative, which corresponds to rate of change of DTO being negative.

In the alternative approach (b), the correlation processor 30 selects samples for removal and replication on the basis of the following equation, which is an approximation derived from satellite motion and is quadratic in time:

$$\tau_m = -\frac{\lambda}{c}b'_1 t_m - \frac{\lambda}{c}b_2 \tau_m^2 = m\Delta t \qquad (14)$$

$t_m$ is the time from initiation of sampling to the mth replicated or removed sample, $\tau_m$ is the total time dilation experienced up to $t_m$, m is the number of sampling intervals removed or inserted to counteract time dilation, $\Delta t$ is the sampling interval (time between successive ADC samples) and $\lambda$ is the wavelength at the centre frequency of the signal sampling band before any frequency downconversion at a receiver 18. The parameter $b'_1$ is an estimate of the time invariant component of DFO $b_1$ with any systematic error (due to satellite turnaround frequency change) corrected using an estimate derived from the reference signal. Alternatively $b'_1$ may be another parameter which is varied in steps in maximising the modulus of the CCF. It is also possible to exploit $b_2$ in the above expression as an independent parameter varied in steps, thereby dissociating time dilation and time variation of DFO.

If the effects of satellite motion are not too severe, it is possible to omit the quadratic second term in Equation (14) in $t_m{}^2$, and apply the resulting linear correction.

Samples preceded by an omitted or inserted sample are multiplied by a phase correction factor P given by one of the following:

$$P = e^{2\pi i f \Delta t}, \text{ or } P = e^{-2\pi i f \Delta t} \quad (15)$$

The exponent in the expression for P is positive or negative according to whether the preceding sample is omitted or inserted; f is the centre frequency of the samples' signal after downconversion for input to an analogue to digital converter, and $\Delta t$ is the interval between successive ADC samples. The samples' signal band is set by an anti-aliasing low-pass filter.

Before time dilation compensation is undertaken, the modulus of the CCF is maximised to obtain approximate values of DFO and the parameters $\tau_0$, $b_1$ and $b_2$ as previously discussed. Time dilation compensation is then implemented by inserting or excising samples as appropriate and adjusting phase in each of the four data sets $z_1$, $z_2$, $p_1$, $p_2$ to produce compensated equivalents. The CCF is then maximised again using the compensated data sets so formed to provide better values of DTO, DFO and if required DFRO and DDROA.

The process of compensation for change in both DFO motion and time dilation is summarised as follows:

(a) obtaining initial values of DFO and DTO using compensation for varying DFO only; (b) time dilation compensation of one data set by delaying/advancing (translating) parts of it relative to an associated data set and applying phase corrections; this involves replicating/ deleting samples as appropriate; and (c) multiplying the sample sets (in the sense of an inner product) to obtain a measure of the signal energy and to vary parameter values to maximise the modulus of the CCF given in general terms by:

$$CCF = [z_1^*][T^{-1}D^{-1}[z_2] \quad (16)$$

It is the CCF modulus which is maximised because noise from receiving equipment is included, which makes signal energy a complex quantity (in the mathematical sense). The $T^{-1}$ and $D^{-1}$ notation is used to indicate translation compensation and frequency distortion compensation respectively, the superscripts denoting reversal of effects introduced by system geometry and kinematics. The brackets [ ] indicate a vector comprising the signal samples. Translation of a relay satellite leads to time dilation because it alters the signal path and therefore also the associated time of flight.

In developing more general expressions for the DTO and DFO it must be borne in mind that the optimisation of the resulting CCF becomes more processor intensive. The approximation described herein using $\tau_0$, $b_1$ and $b_2$ is well within the capabilities of current parallel processors.

It is expedient to represent the distortion compensation in terms of a DFO compensation and a separate DTO compensation because a rapid change of phase is removed by this approach, leaving the DTO dilation compensation acting on one data stream without the need for interpolation between signal samples.

Figure 9:
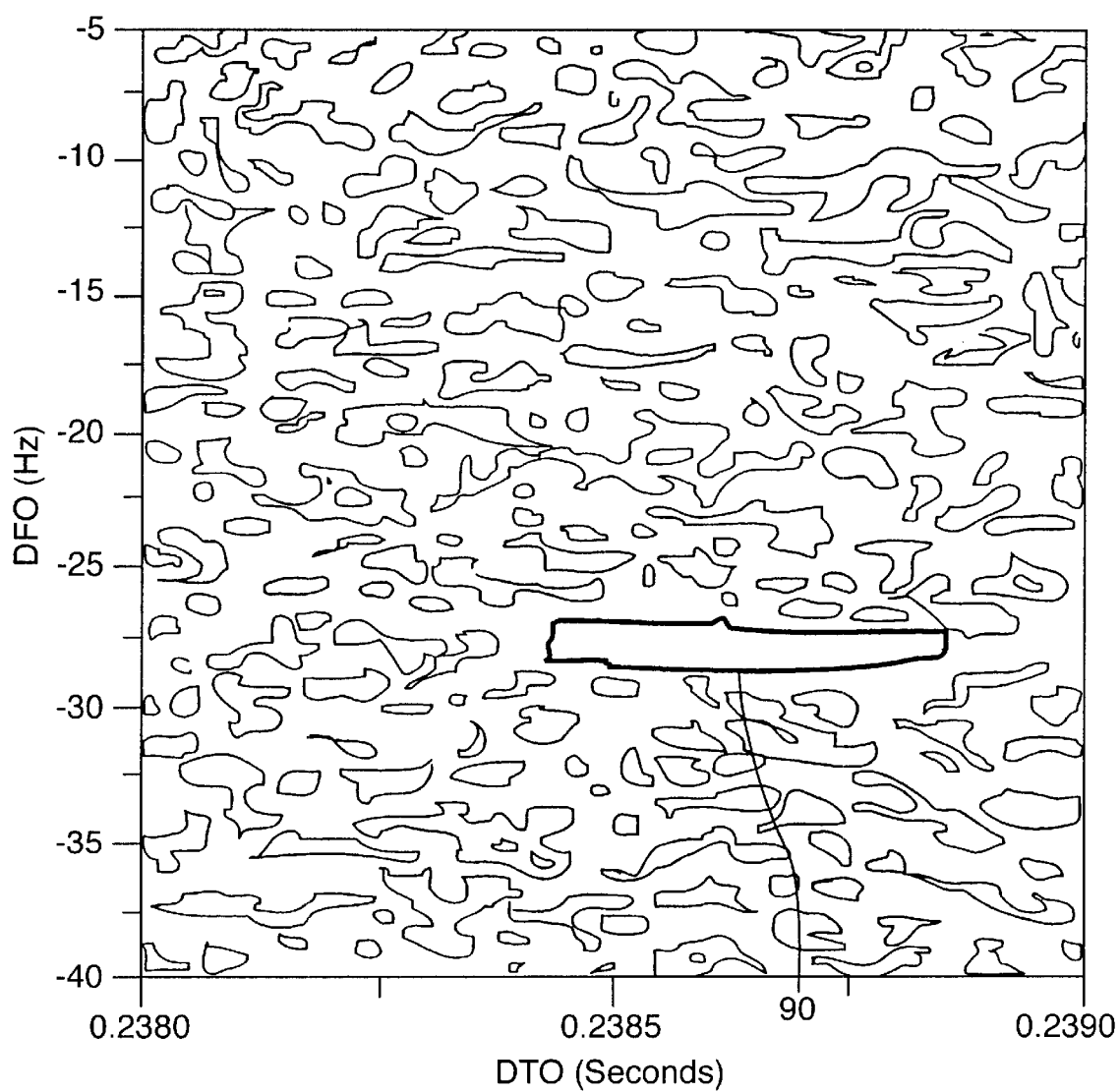
Figure 10:
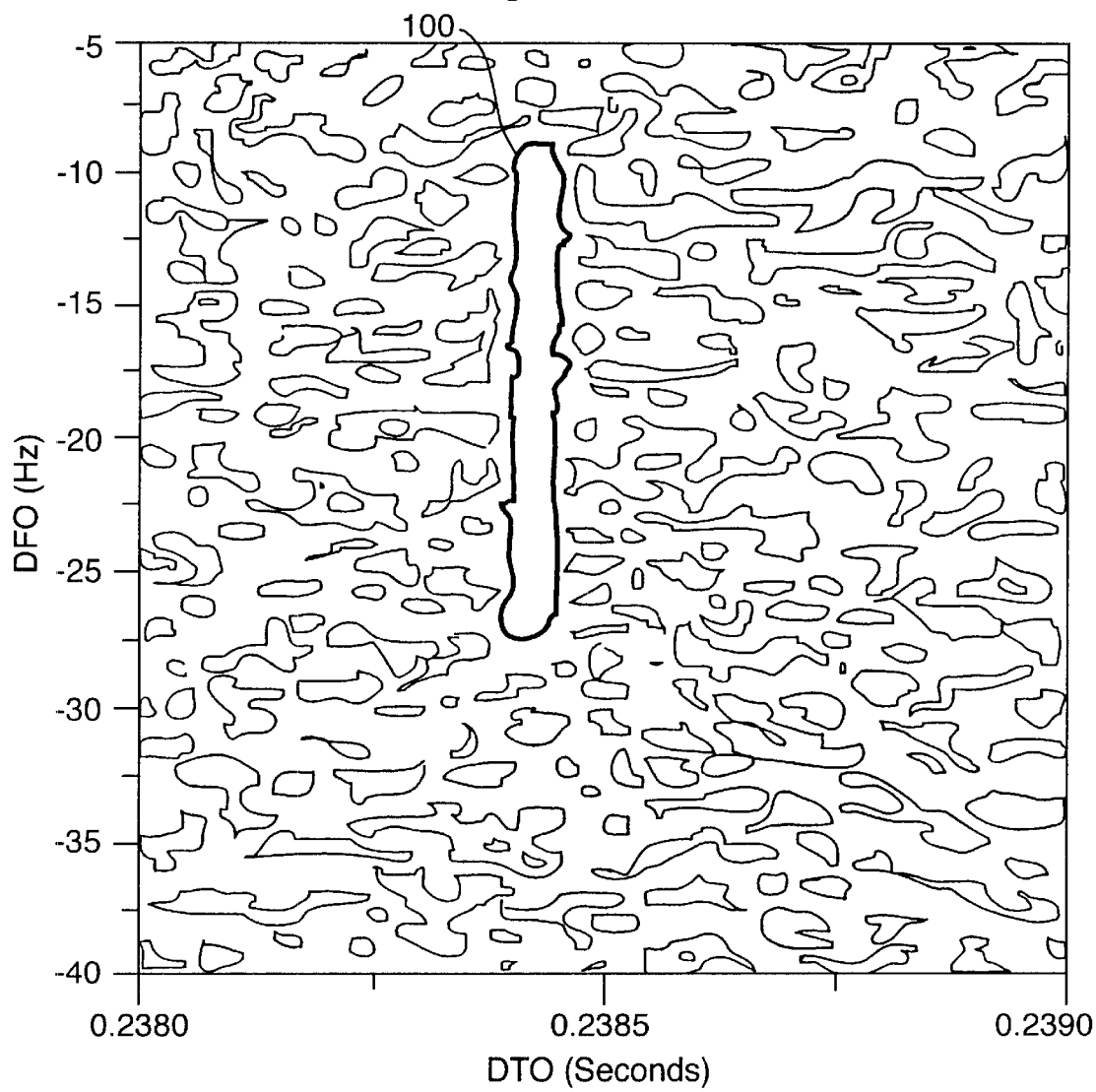
Figure 11:
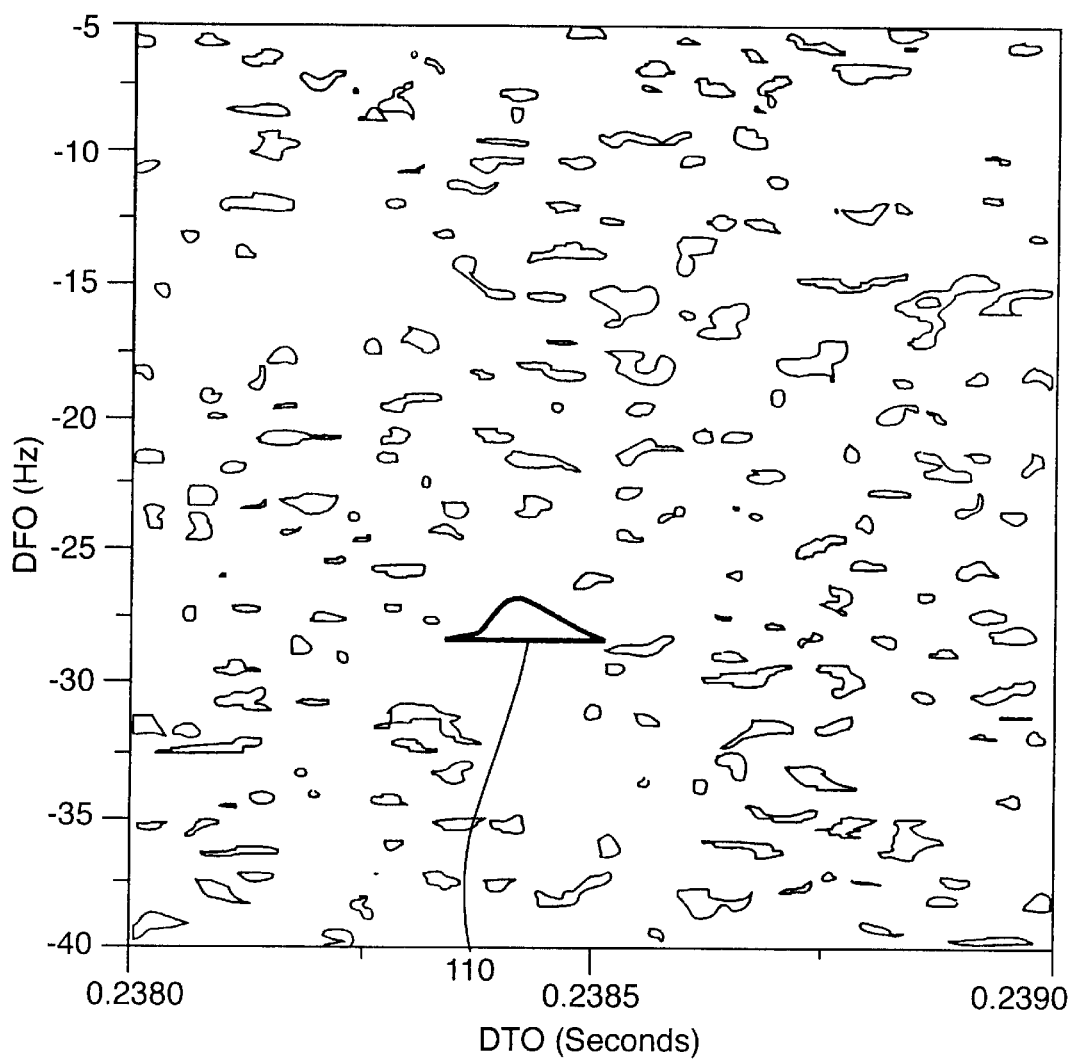

Referring now to FIGS. 8 to 11, the effects of counteracting DFO variation and time dilation in accordance with the invention are illustrated graphically. These drawings are plots of DTO against DFO derived using simulated data without significant noise. In FIG. 8, DFO varies with DTO over a region 80 which includes error limits. FIG. 9 illustrates the effect of frequency compensation alone, ie counteracting change in DFO. A region 90 is produced which is parallel to the DFO axis indicating DFO is now constant. FIG. 10 is the equivalent of FIG. 9 for time or DTO compensation alone, and shows a region 100 of constant DTO. The combination of both these procedures is shown in FIG. 11, which shows a single peak of constant DFO and DTO. Compensation for DTO variation was carried out using the linear term in Equation (14) only.

Figure 12:
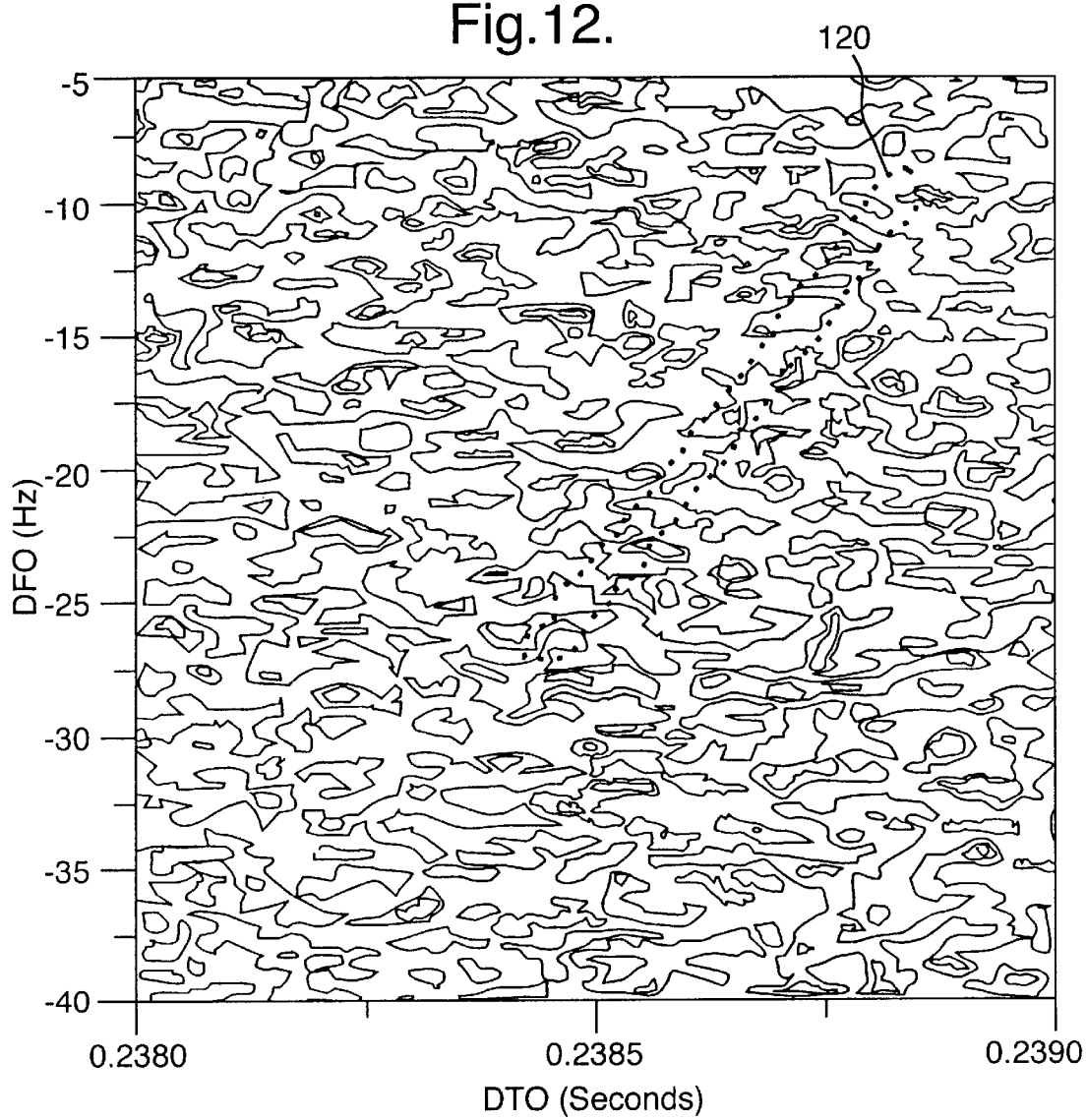
FIGS. 12 to 14 are equivalent to FIGS. 8, 9/10 and 11 respectively with addition of the effects of noise.
Figure 13:
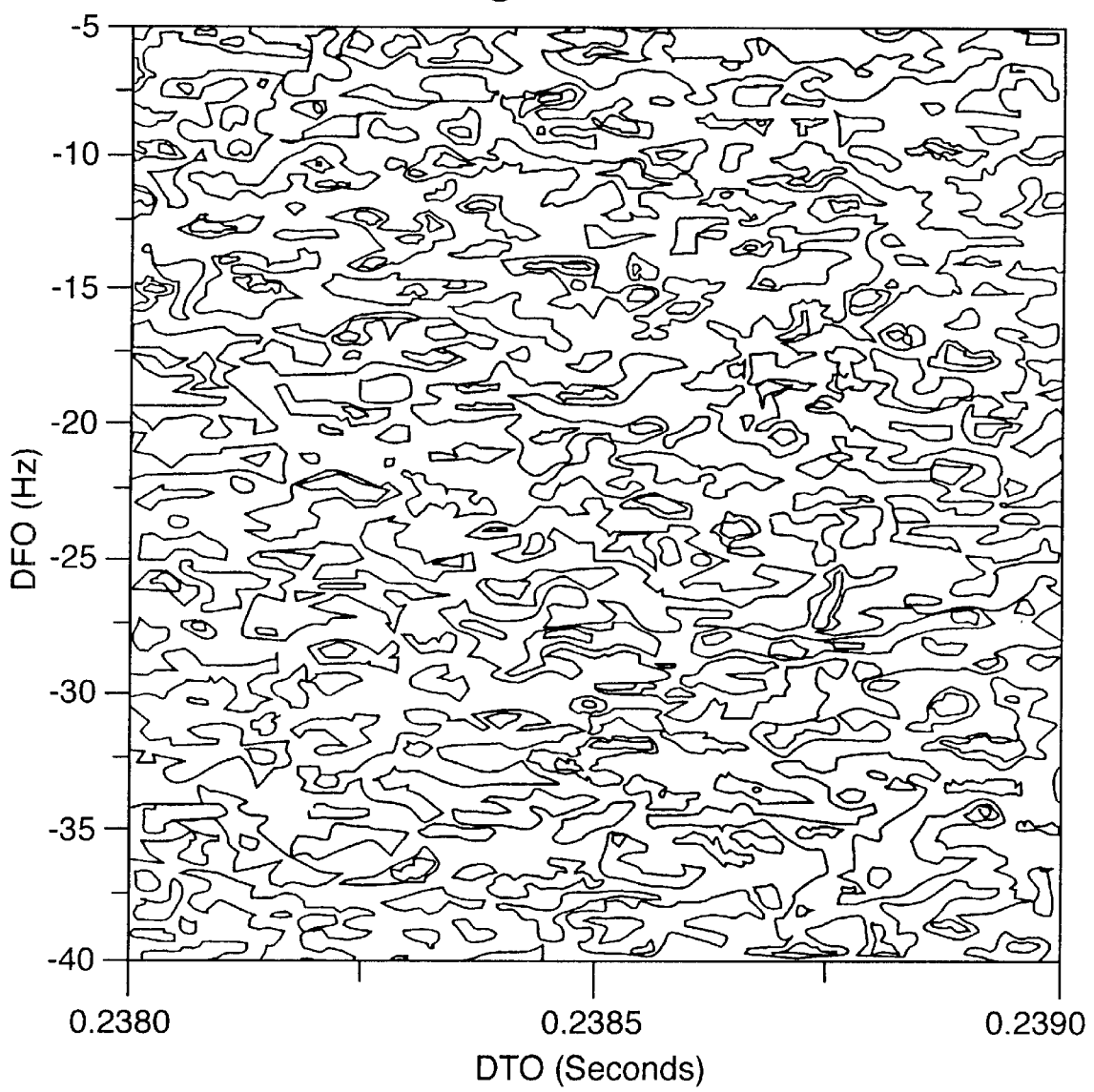
Figure 14:
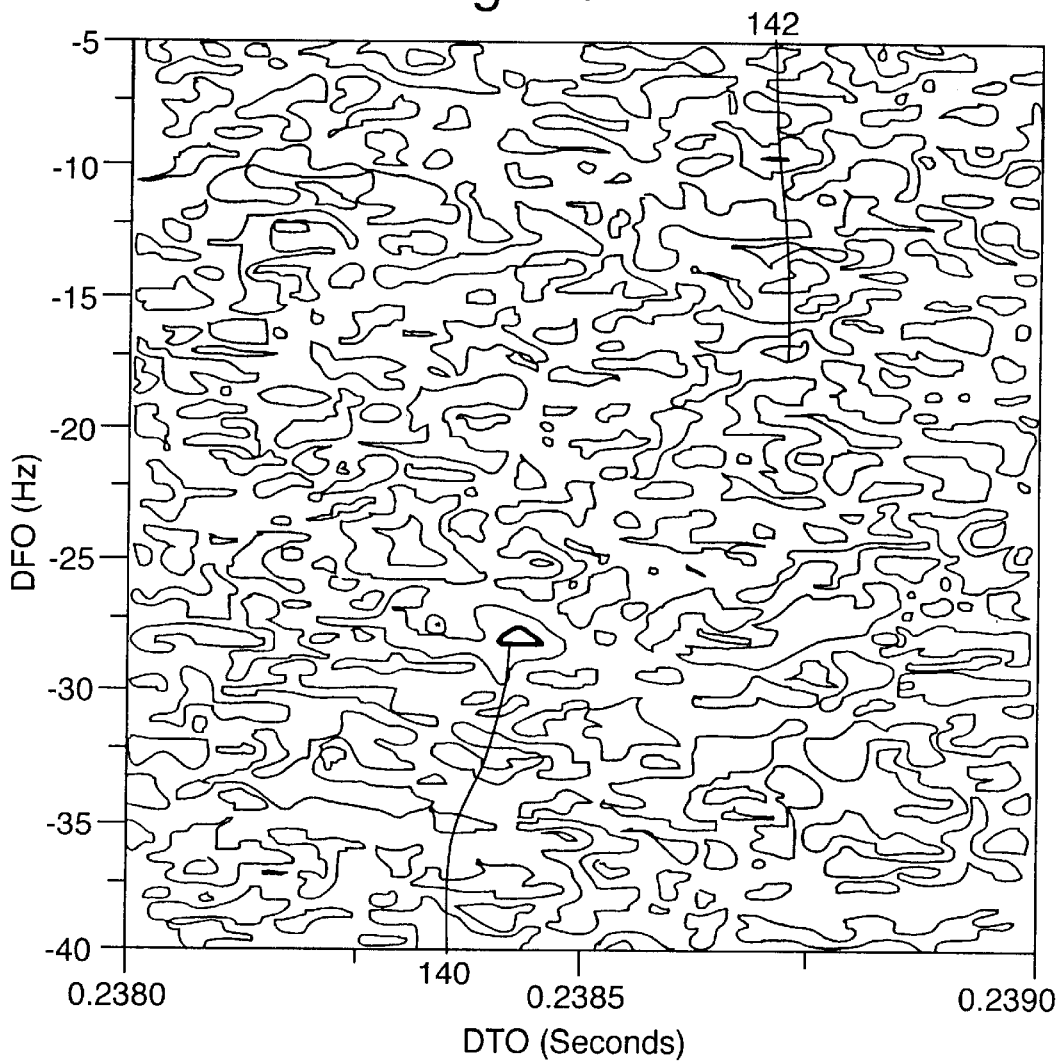

FIGS. 12 to 14 illustrate graphically the effect of introducing noise. Except as regards noise they were produced using the same data as FIGS. 8 to 11, and they would show precisely the same features absent the noise. It can be seen that DTO and DFO are not visible in FIGS. 12 and 13, either without compensation (FIG. 12) or with compensation for only one of frequency distortion and time distortion (FIG. 13), which give like results. FIG. 14 has a single peak 140 easily discernable above surrounding noise such as 142; it demonstrates that compensation for both frequency and time distortion in accordance with this invention leads to DTO and DFO values being obtainable despite the presence of noise.

What is claimed is:

1. A method of locating the source of an unknown signal received by a plurality of signal relays, the method including the steps of:

(a) arranging for a plurality of receivers to receive replicas of the unknown signal via respective signal relays; and (b) subjecting the replicas to correlation processing;

wherein step (b) is preformed with data sets adapted in phase and subject to sample adjustments to counteract time dilation.

2. A method according to claim 1 wherein samples in one of two data sets to be correlated are adapted in phase by samples following a removed sample being multiplied by a phase factor or by samples including and following a replicated sample being multiplied by such a factor, the phase factor being either $e^{2\pi i f \Delta t}$ or $e^{-\pi i f \Delta t}$ according to which of the two data sets is adapted and to the sign of DTO change with time, and wherein f is a signal band centre frequency of the samples after downconversion for sampling and $\Delta t$ is an interval between successive samples.

3. A method according to claim 1 wherein samples are selected for removal or replication as the case may be on the basis of the correlation function's time dimension spread over an interval in which the samples were obtained.

4. A method according to claim 1 wherein samples are selected for removal or replication as the case may be on the basis of at least a linear approximation to the following quadratic equation for $t_m$:

$$\tau_m = -\frac{\lambda}{c} b'_1 t_m - \frac{\lambda}{c} b_2 \tau_m^2 = m \Delta t$$

where $t_m$ is the time to the mth replicated or removed sample, m is the number of replicated or removed samples up to time $t_m$, $96_m$ is the total time dilation up to time $t_m$, $\Delta t$ is the time interval between successive samples and $\lambda$ is the free space wavelength at the centre frequency of the sampling band, $b'_1$ is an estimate of DFO at initiation of sampling corrected for any systematic error in frequency, and $b_2$ is half of the rate of change of DFO with time.

5. A method according to claim 1 wherein step (b) is performed with a complex correlation function (CCF) at least partly compensated for change in the replicas' Differential Frequency Offset (DFO) with time due to relay motion relative to the source and receivers.

6. A method according to claim 5 wherein the correlation function is a complex correlation function referred to as a CCF given by:

$$CCF \equiv A(\tau_0, b_1, b_2) = \int_0^T z_1^*(t)z(t+\tau_0)e^{-2\pi i(b_1+2b_2t)t}\,dt$$

where $z_1$ and $z_2$ are data sets representing two signals being correlated, the asterisk denotes the complex conjugate of $z_1$, T is the time over which samples are taken, $\tau_0$ is a time invariant component of Differential Time Offset (DTO), and $b_1$ and $b_2$ are constants in an expression for change in DFO with time t as follows: DFO≡v=$b_1$ +2 $b_2$t, and wherein the CCF is at least partly maximized by inserting therein trial values of $b_2$ and versions of $z_1$ and $z_2$ adapted to contain added or removed sample values to counteract time dilation.

7. A method according to claim 4, wherein after each iteration of step (b) the product of $z_1^*(t)z_2(t-\tau_0)\exp(-2\pi i b_2 t^2)$ is Fourier transformed to the frequency domain, in order to provide for DFO $b_1$ to be obtainable as the frequency offset at which the CCF maximum occurs.

8. A location device for locating the source of an unknown signal received by a plurality of signal relays, and including:
   (a) a plurality of receivers for receiving replicas of the unknown signal via respective signal relays;
   (b) a correlation processor for correlating the replicas and obtaining a correlation maximum indicating at least one of their DTO and DFO;
   wherein the correlation processor is arranged to perform correlation with data sets adapted in phase and subject to sample adjustments to counteract time dilation.

9. A location device according to claim 8 wherein the correlation processor is arranged to adapt in phase one of two sets of data samples to be correlated by multiplying samples following a removed sample by a phase factor or multiplying a replicated sample and samples following it by a such a factor, the phase factor being either $e^{2\pi i f \Delta t}$ or $e^{-2\pi i f \Delta t}$ according to which of the two data sets is adapted and to the sign of DTO change with time, and wherein f is a signal band centre frequency of the samples after downconversion for sampling and $\Delta t$ is an interval between successive samples.

10. A location device according to claim 8 wherein the correlation processor is arranged to select samples for removal and replication on the basis of the correlation function's time dimension spread over an interval in which the samples were obtained.

11. A location device according to claim 8 wherein the correlation processor is arranged to select samples for removal and replication on the basis of at least the linear term of the following quadratic equation in $t_m^2$:

$$\tau_m = -\frac{\lambda}{c}b_1' t_m - \frac{\lambda}{c}b_2 \tau_m^2 = m\Delta t$$

where $t_m$ is the time from initiation of sampling to the mth replicated or removed sample, m is the number of replicated or removed samples up to time $t_m$, $\tau_m$ is the total time dilation up to time $t_m$, $\Delta t$ is the time interval between successive samples, $\lambda$ is the free space wavelength at the centre frequency of the sampling band, $b_1'$ is an estimate of DFO at initiation of sampling corrected for any systematic error in frequency, and $b_2$ is half of the rate of change of DFO with time.

12. A device according to claim 8 wherein the correlation processor is arranged to perform correlation with a complex correlation function (CCF) at least partly compensated for change in DFO with time due to relay motion relative to the source and receivers.

13. A device according to claim 12 wherein the correlation processor is arranged to employ a CCF which contains an exponent of a function of time having a first term which is a constant DFO value and a second term which is a product of time and a constant value for rate of change of DFO with time, comprising a constant differential frequency rate offset (DFRO) value, and wherein the correlation processor is also arranged to introduce trial values of DFRO and to iteratively evaluate correlation for pairs of trial values of DTO and DFRO to determine a DFRO value enabling a correlation maximum to be obtained.

14. A device according to claim 13, wherein the CCF is given by:

$$CCF \equiv A(\tau_0, b_1, b_2) = \int_0^T z_1^*(t)z(t+\tau_0)e^{-2\pi i(b_1+2b_2t)t}\,dt$$

where $z_1$ and $z_2$ are data sets representing two signals being correlated, the asterisk denotes the complex conjugate of $z_1$, T is the time over which samples are taken, $\tau_0$ is a time invariant component of DTO, and $b_1$ and $b_2$ are constants in an expression for change in DFO with time t as follows: DFO≡v=$b_1$+2$b_2$t, and wherein the correlation processor is arranged to maximise the CCF by evaluating it with trial values of $b_2$ in addition to those of $\tau_0$ together with versions of $z_1$ and $z_2$ adapted to contain replicated or removed sample values to counteract time dilation.

15. A device according to claim 14 wherein the correlation processor is arranged to Fourier transform successive products $z_1^*(t)z_2(t+\tau_0)\exp(-2\pi i b_2 t^2)$ to the frequency domain in order to obtain DFO $b_1$ as a frequency offset at which a CCF maximum occurs.

* * * * *

UNITED STATES PATENT AND TRADEMARK OFFICE
CERTIFICATE OF CORRECTION

PATENT NO. : 6,618,009 B2
DATED : September 9, 2003
INVENTOR(S) : Griffin et al.

It is certified that error appears in the above-identified patent and that said Letters Patent is hereby corrected as shown below:

<u>Column 16,</u>
Line 62, "$t_m$, $96_m$" should read -- $t_m$, $\tau_m$ --;
and "$t_m \Delta t$" should read -- $t_m$, $\Delta t$ --
Line 63, "samples and" should read -- samples, --

Signed and Sealed this

Twenty-third Day of March, 2004

JON W. DUDAS
*Acting Director of the United States Patent and Trademark Office*